United States Patent [19]

Wada et al.

[11] Patent Number: 4,543,711
[45] Date of Patent: Oct. 1, 1985

[54] SYSTEM FOR AUTOMATICALLY INSERTING U-TUBES OF HEAT EXCHANGER OR THE LIKE

[75] Inventors: Takeshi Wada; Hisanao Kita; Tatsuji Wada; Susumu Fujishima, all of Hitachi; Hironori Kadowaki, Ibaraki, all of Japan

[73] Assignee: Hitachi, Ltd., Tokyo, Japan

[21] Appl. No.: 610,409

[22] Filed: May 15, 1984

[30] Foreign Application Priority Data

May 20, 1983 [JP] Japan .................................. 58-87749

[51] Int. Cl.⁴ ............................................ B23P 15/26
[52] U.S. Cl. ..................................... 29/726; 29/281.1; 29/281.4; 29/709; 29/714; 29/824; 414/18; 414/745; 414/746; 901/31
[58] Field of Search ............ 29/157.3 C, 157.4, 281.1, 29/281.4, 559, 709, 714, 726, 727, 822, 823, 824; 414/14, 16, 18, 745, 746; 901/31, 39, 46, 47

[56] References Cited

U.S. PATENT DOCUMENTS

| 3,785,506 | 1/1974 | Crocker et al. | 414/745 |
| 3,810,553 | 5/1974 | Crocker et al. | 414/745 X |
| 3,824,668 | 7/1974 | Wightman | 29/727 |
| 4,104,790 | 8/1978 | Hindricks | 29/726 X |
| 4,125,928 | 11/1978 | Crawley et al. | 29/157.3 R X |
| 4,221,534 | 9/1980 | Retliy | 29/726 X |
| 4,362,454 | 12/1982 | Kripzak | 414/745 X |
| 4,380,868 | 4/1983 | Hall | 29/726 |
| 4,382,329 | 5/1983 | Takaoka et al. | 29/726 |

FOREIGN PATENT DOCUMENTS

| 51103 | 4/1979 | Japan | 29/714 |
| 26644 | 3/1981 | Japan | 29/157.4 |

Primary Examiner—Howard N. Goldberg
Assistant Examiner—Ronald S. Wallace
Attorney, Agent, or Firm—Beall Law Offices

[57] ABSTRACT

Disclosed is a system for automatically successively inserting a plurality of U-shaped heat transfer tubes into holes of support members of an equipment such as a heat exchanger. The system has fixing means for removably fixing the support members such that the corresponding holes of the support members are axially aligned; gripping means adapted to pick up one of the heat transfer tubes and movable to bring the heat transfer tube toward the holes of supporting members; a positioning means disposed between the gripping means and the fixing means and adapted to hold the gripped heat transfer tube horizontally and to make the same align with the holes in the support members; and control means operatively connected to the gripping means and the positioning means so as to sequentially control the operation of both means in a predetermined sequence. The system operates as follows under the control of the control means. The gripping means grips the heat transfer tube and raises the same. The gripping means is then moved toward the support members while the positioning means supports the heat transfer tube. As the heat transfer tube is inserted deeper into the support members, the support of the tube by the positioning means is released. The gripping of the tube by the gripping means is released and the gripping means is then returned to the position for picking up the next tube, after the completion of the insertion of the heat transfer tube.

7 Claims, 15 Drawing Figures

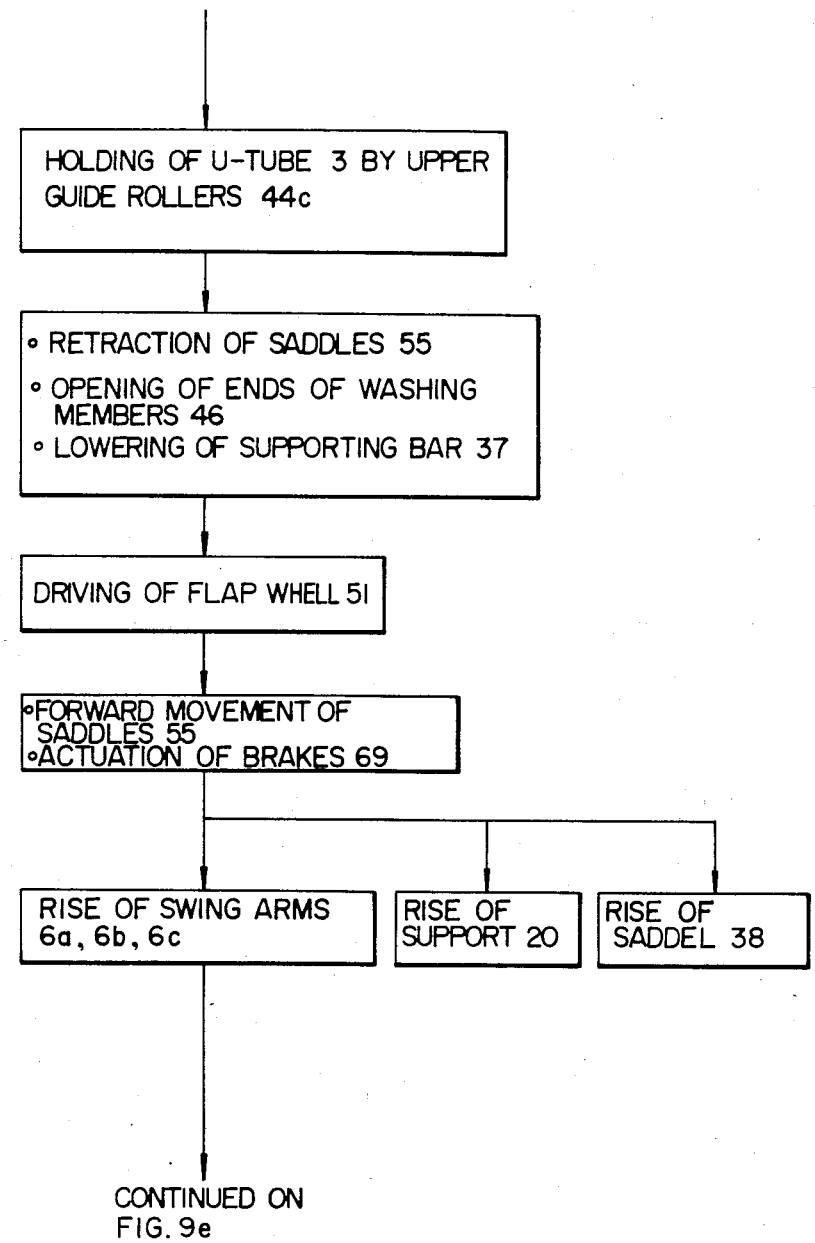

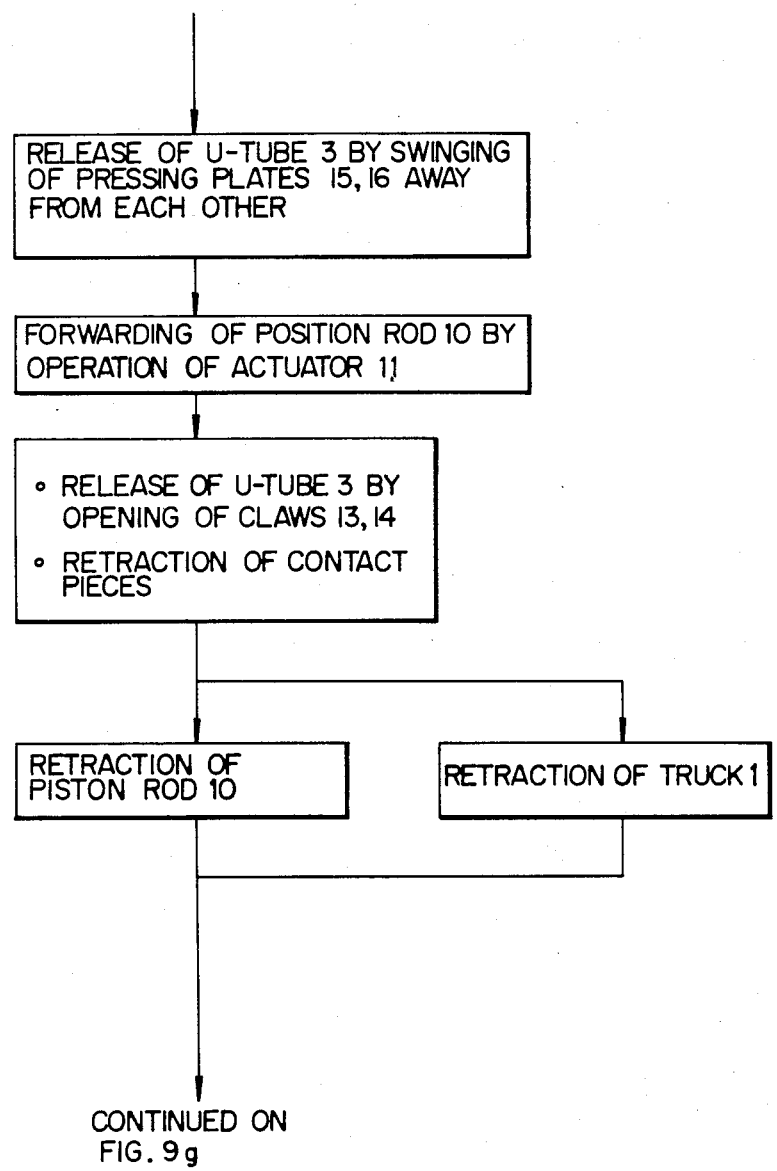

SYSTEM FOR AUTOMATICALLY INSERTING U-TUBES OF HEAT EXCHANGER OR THE LIKE

BACKGROUND OF THE INVENTION

The present invention relates to a system for automatically inserting U-shaped heat transfer tubes (referred to as "U-tubes", hereinunder) into an equipment such a heat exchanger, boiler, cooler or the like.

U-tubes installed in an equipment of the kind mentioned above are usually supported by, for example, perforated partition plates. In inserting the U-tubes into the equipment, therefore, it is necessary to press-fit the tubes in alignment with the apertures in the supporting members such as partition plates, in order to eliminate any permanent strain of the U-tubes. In some cases, the U-tubes which have been inserted have to be withdrawn, due to a reason concerning the assembling process.

To meet there technical demands, hitherto, the insertion of U-tubes has to be made manually because no automatic apparatus has been developed yet for automatically grasping a U-tube, holding the U-tube in a horizontal posture, driving the U-tube into apertures of the supporting plate in such a manner as to avoid any damage and distortion of the U-tube and, as required, withdrawing the U-tubes from the supporting member. Thus, the insertion of the U-tubes has been made by manual work of skilled workers with much labour and cost.

SUMMARY OF THE INVENTION

Accordingly, an object of the invention is to provide an automatic system for inserting U-tubes capable of automatically inserting the tubes into a supporting member of an equipment such as a heat exchanger in which the U-tubes are to be installed, without causing any damage on the U-tubes. The term "heat exchanger" in this specification is used to broadly mean equipments having heat transfer tubes in the form of U-tubes, such as feedwater heaters, boilers, coolers and so forth.

To this end, according to the invention, there is provided an automatic tube inserting system for inserting a plurality of U-shaped heat transfer tubes successively into supporting members of an equipment such as a heat exchanger, the system comprising: fixing means for removably fixing the support members at a predetermined pitch, each of the support members having a plurality of holes for receiving the heat transfer tubes, such that two holes in each support member for receiving both straight portions of an identical heat transfer tube are located at a substantially equal level and the corresponding holes in the support members are axially aligned; gripping means for gripping a heat transfer tube and raising the same to the level of holes into which the heat transfer tube is to be inserted, the gripping means being movable relatively to the support members so as to be able to press the gripped heat transfer tube in the direction of the aligned holes; positioning means disposed between the gripping means and the support members fixed by the fixing means, the positioning means being adapted to clamp the heat transfer tube on the gripping means from the upper and lower sides and to clamp the straight portions of the heat transfer tube from both lateral sides to bring the heat transfer tube into alignment with the holes which are to receive the heat transfer tube while keeping the heat transfer tube in a horizontal posture; and control means operatively connected to the gripping means and the positioning means so as to sequentially control the operation of both means in accordance with a previously set order of insertion of the heat transfer tubes and the widths of the heat transfer tubes.

The above and other objects, features and advantages of the invention will become clear from the following description of the preferred embodiment taken in conjunction with the accompanying drawings.

BRIEF DESCRIPTION OF THE DRAWINGS

FIGS. 9a to 9g are block diagrams showing the procedure of operation of the embodiment.

DESCRIPTION OF THE PREFERRED EMBODIMENT

A preferred embodiment of the invention will be explained hereinunder with reference to the accompanying drawings.

Figure 1:
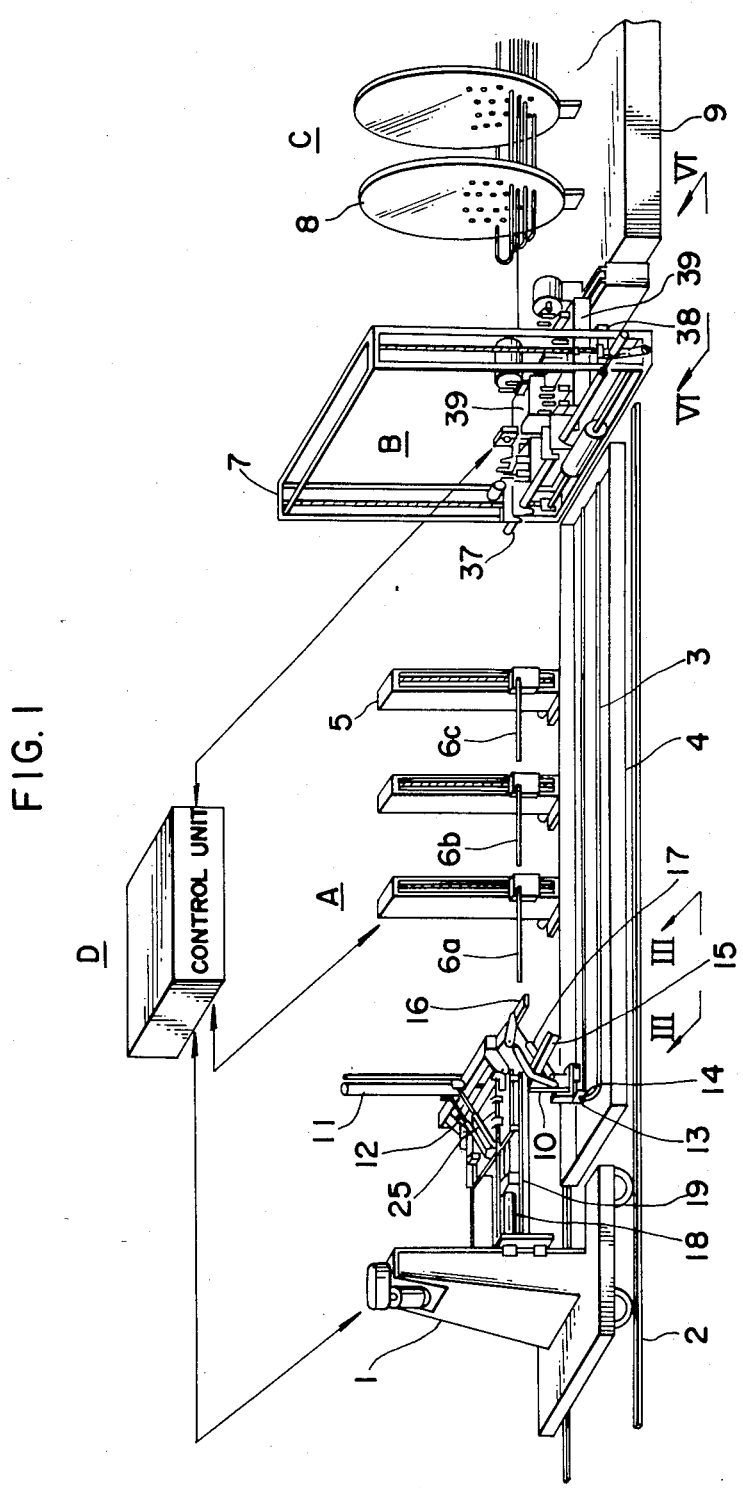
FIG. 1 is a perspective view of an automatic insertion system in accordance with the invention, in a state in which the system grasps and picks up a U-tube.
Figure 2:
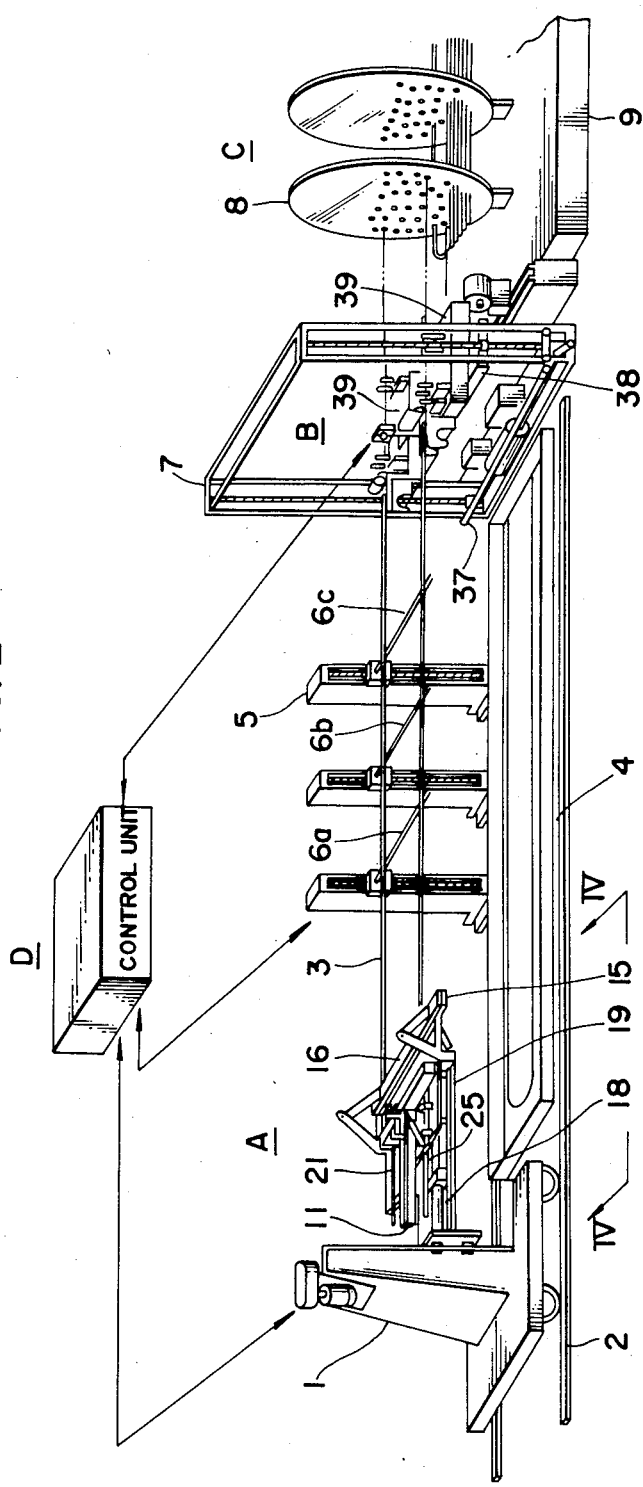
FIG. 2 is a perspective view similar to FIG. 1, showing the automatic system in a state in which the system is going to insert the U-tube into partition plates.

FIGS. 1 and 2 show the general arrangement of an automatic U-tube insertion system in accordance with the invention, respectively, in a state in which a U-tube is being grasped and picked up by the system and in a state in which the U-tube 3 is being held horizontally and going to be inserted into holes of a partition plate 8. This embodiment of the automatic U-tube insertion system has a U-tube holding apparatus A, positioning apparatus B and a partition plate holding apparatus C which are arranged in the same direction at spaces predetermined in accordance with the lengths of U-tubes to be inserted. The system further has a control unit D which controls the operation of the above-mentioned apparatus A and B. The direction of movement from the position of the holding apparatus A towards the partition plate holding apparatus C will be referred to as the tube inserting direction.

As will be detailed later, a device for grasping and picking up a U-tube 3 accomodated by a box 4 is provided in the U-tube holding apparatus A, together with a device for holding the picked-up U-tube in a horizontal posture by clamping the same from the upper and lower sides. These devices are mounted on a truck 1 which is adapted to run on rails 2 in the tube inserting direction by means of the driving of a motor which also is mounted on the truck 1. A plurality of swing posts 5 (three posts in the illustrated embodiment) each having a swing arm 6 are disposed along the rails 2. These swing posts 5 are adapted to support the U-tube from the lower side to maintain predetermined heights of portions of the U-tube.

Each swing post 5 is provided with a screw shaft which extends in the heightwise direction of the post, as well as a motor for driving the swing arm 6. Each of the swing arms 6a, 6b, 6c is mounted on the associated swing post 5 such that it is movable by the power of these motors vertically, i.e. in the directions perpendicular to the tube inserting direction and is also rotatable in horizontal planes. In the state shown in FIG. 1, the swing arms have been rotated to be directed in the direction opposite to that for inserting tubes and moved to lowered positions, whereas, in FIG. 2, there swing arms have been raised and rotated to extend transversely of the tube inserting direction.

The positioning apparatus B has a saddle 38 movable in the direction perpendicular to the tube inserting direction and a pair of saddles 39 which are movable horizontally and transversely of the tube inserting direction. As will be explained later, these saddles are driven by respective motors under the control of the control unit D so as to determine and maintain the position and height of the U-tube 3. In the described embodiment, the positioning apparatus B includes a devices for washing and polishing the U-tube.

The partition plate holding means C is for removably fixing a predetermined number of partition plates at a predetermined pitch, and incorporates a table 9. Each partition plate 8 incorporates a multiplicity of holes for receiving U-tubes formed at predetermined pitches. The partition plates 8 are fixed on the table 9 such that two holes of each plate for receiving an identical U-tube are located at a substantially equal level and corresponding holes of these plates are axially aligned.

The control unit D is adapted for controlling the sequence of operation of the above-described apparatus and is provided with a numerical control (NC) circuit incorporating a microcomputer. The control unit D is operatively connected to the U-tube holding apparatus A and the positioning aparatus B so that the control unit D, upon receipt of signals from various sensors on respective apparatus, electrically drives the motors of apparatus or activates fluid actuators of apparatus through the intermediary of a fluid, in sequences and with control conditions which are beforehand stored in the NC circuit.

Figure 3:
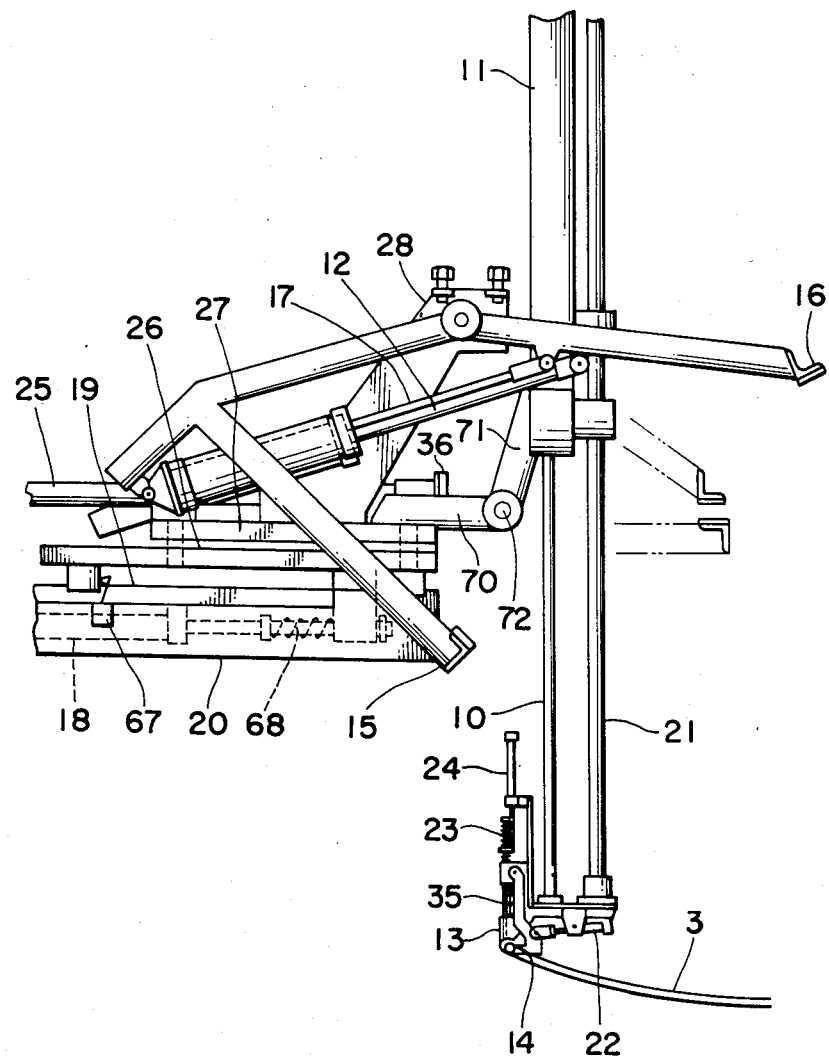
FIG. 3 is a side elevational view of an essential part of a U-tube holding apparatus incorporated in the system shown in FIG. 1, as viewed in the direction of arrow III—III of FIG. 1.
Figure 4:
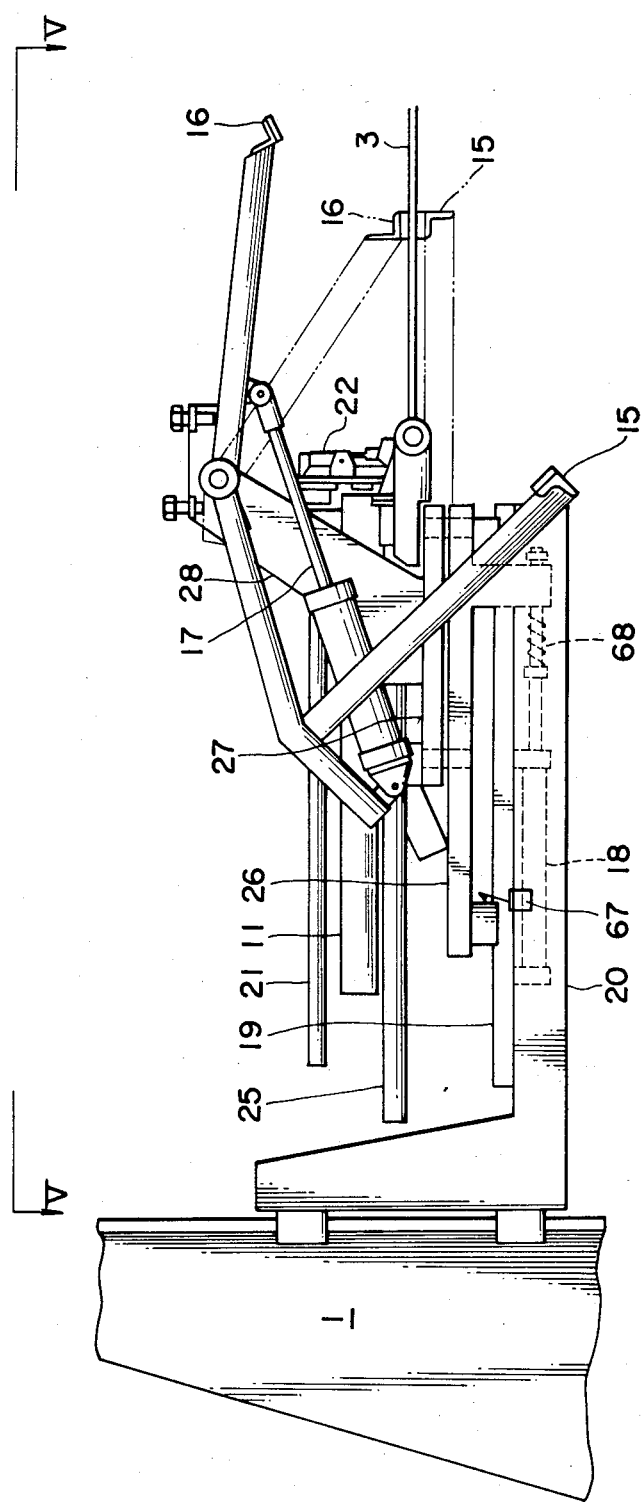
FIG. 4 is a side elevational view of an essential part of the U-tube holding apparatus as viewed in the direction of arrows IV—IV in FIG. 2.
Figure 5:
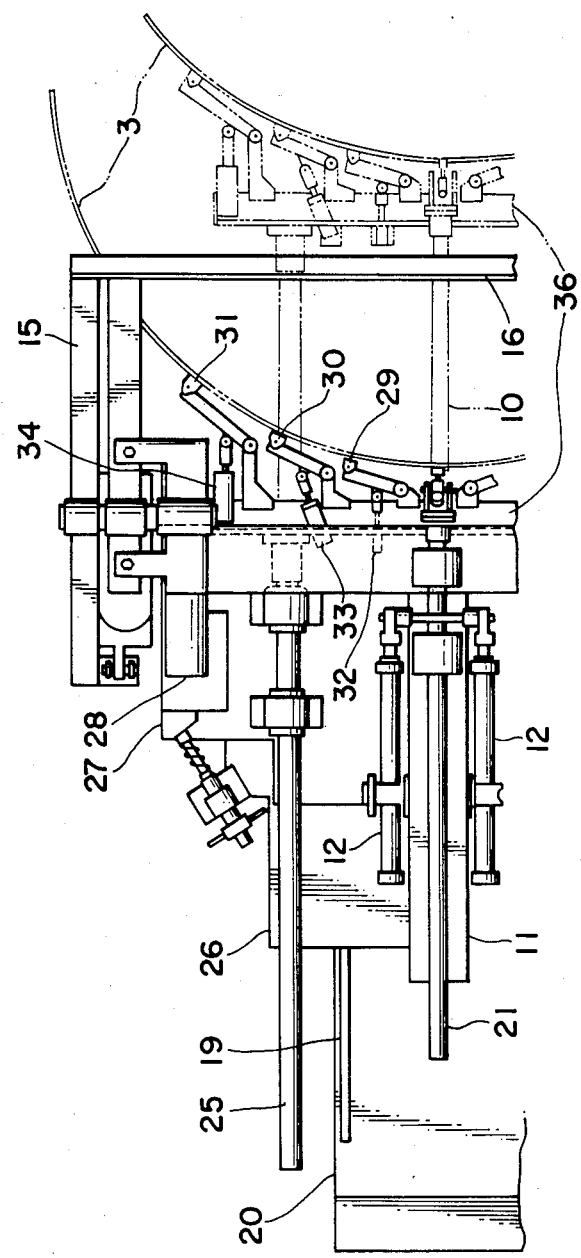
FIG. 5 is a plan view of an essential part of the U-tube holding apparatus, as viewed in the direction of arrow V—V of FIG. 4.

FIGS. 3 to 5 show, in a larger scale, a device for grasping and picking up the U-tube 3 and a device for clamping the U-tube from the upper and lower sides of the later. A reference numeral 11 designates a fluid actuator having a piston rod 10 which in turn is provided at its end with claws 13, 14 for gripping the bent portion of the U-tube. The fluid actuator 11 is mounted on a table 27 through joint members 70, 71 which can be flexed at pivot portion 72. Another connection between the fluid actuator 11 and the table 27 is made through a pair of fluid actuator 12. (see FIG. 5) The fluid actuator 11 is rotatable around the pivot portion 72 between a first position in which is to substantially perpendicular to the tube inserting direction and a second position in which the same is held in parallel with the tube inserting direction, by the extending and retracting operation of the fluid actuator 12.

The table 27 is mounted on another table 26 and is adapted to be slightly adjustable in the rotational direction with respect to the tabe 26. The table 26 is movable along rails 19 laid on a support 20 and is adapted to be driven by a fluid actuator 18 mounted on the support 20. The fluid actuator 18 is connected to the table 26 in such a manner as to drive the table 26 in the tube inserting direction through the intermediary of a spring 68. A limit switch 67 is secured to the support 20. This limit switch is activated to stop the inserting operation when the table 26 is retracted rearwardly against the force of the spring 68 due to, for instance, a collision of the U-tube with a partition plate during the insertion. The support 20 is movable along rails provided on the truck 1 and extending in the heightwise direction (see FIG. 4), so as to be driven up and down on the truck 1 by the operation of a motor mounted on the truck 1, under the control by the control unit.

In order to prevent deflection of the piston rod 10 of the fluid actuator 11 to enhance the precision of operation, a guide bar 21 is provided for sliding movement in parallel with the fluid actuator 11, and is connected at its end to the end of the piston rod by a connecting member. The claw 13 has a recess of curvature for fitting the outer surface of the U-tube 3 and is fixed to the connecting member. The claw 14 has a hook-like shape and is pivotally connected to the claw 13 such that the recess of the claw 13 and the hook-shaped portion of the claw 14 are moved towards and away from each other by the operation of a fluid actuator 22. A sensor 23 with a contactor which is adapted to be moved up and down along a guide provided on the center of the claw 13, is provided for confirming the presence of the U-tube 3 in the claws. In the automatic operation of the tube inserting system, the fluid actuator 22 is started as the sensor 23 senses the presence of the U-tube to make the grip and release of the bent portion of the U-tube 3.

A fluid actuator 24 is connected to the sensor 23 to lift the same and is used whenever the operation of the claw 14 is necessary, regardless of the presence of the U-shaped tube 3.

As will be clearly seen from FIG. 5, in order to guide the operation of the fluid actuator 11 to enhance the precision of operation of the same, a pair of guide bars 25 one of which is shown in FIG. 5, are provided on the table 27 for sliding movement in parallel with the actuator 11. A plate 36 is attached to the ends of the guide bars 25 so as to extend transversely of the tube inserting direction. The plate 36 is provided with a notch adapted to engage with a groove 35 formed in a part of the claw 13 when the actuator 11 is rotated from the vertical position shown in FIG. 3 to a horizontal position shown in FIG. 4 after the piston rod 10 is retracted. When the actuator 11 is operated again after the engagement of the groove 35 of the claw 13 and the plate 36, the piston rod 10 is moved together with the plate 36 while being guided by the guide bars 21 and 25 as shown in FIG. 5 with two dot-and-dash lines.

The U-tube holding apparatus A further has a device for clamping the U-tube 3, while the U-tube is held by the claws 13, 14 and lifted by the actuator 11, from the upper and lower side of the latter. The device includes a pressing plate 16 which operates to press the U-tube 3 from the upper side, a pressing plate 15 for pressing the U-tube from the lower side and a pair of fluid actuators 17 adapted to drive these pressing plates. Both of the pressing plates 15 and 16 are pivotally secured to the support 28, and are swung as indicated by two-dot-and-dash lines and full lines in FIGS. 3 and 4 by the operation of the actuators 17 which are connected at their ends to the pressing plate 15 and their other ends to the pressing plate 16, respectively.

The U-tube holding apparatus, constructed as explained hereinbefore, is shown in FIG. 1 in a state in which the fluid actuator 11 is in the vertical posture. In this state, the U-tube 3 gripped by the clows is lifted as the piston rod 10 is retracted.

In the state of the U-tube holding apparatus shown in FIG. 2, the actuator 11 is held in a horizontal posture. As the piston rod 10 is extended again in this state, the U-tube 3 is pushed towards the partition plates 8.

In FIG. 5 which shows a half part of the U-tube holding apparatus, reference numerals 29, 30 and 31 denote contact pieces which are mounted on the plate 36. These contact pieces 29, 30 and 31 are adapted to contact with the bent portion of the U-tube by the operation of respective fluid actuators 32, 33 and 34 so as to apply the inserting force uniformly along the curvature of the bent portion of the U-tube in the inserting operation.

A description will be made hereinunder as to the construction of the positioning apparatus B.

A reference numeral 7 designates a frame which defines an opening in the tube inserting direction. The aforementioned saddle 38 is disposed in the opening of the frame 7. As will be clearly seen from FIG. 1, the saddle 38 is provided in its both side portions with threaded holes which engage with screw shafts extending in the heightwise direction from bottom ends of the frame 7, respectively.

The screw shafts on both sides of the frame 7 are adapted to be driven simultaneously by a motor which is provided on the bottom of the frame 7, thereby to drive the saddle 38 up and down. The vertical movement of the saddle 38 is guided by rails 65 and 66 which are provided on both side portions of the frame 7.

Figure 7:
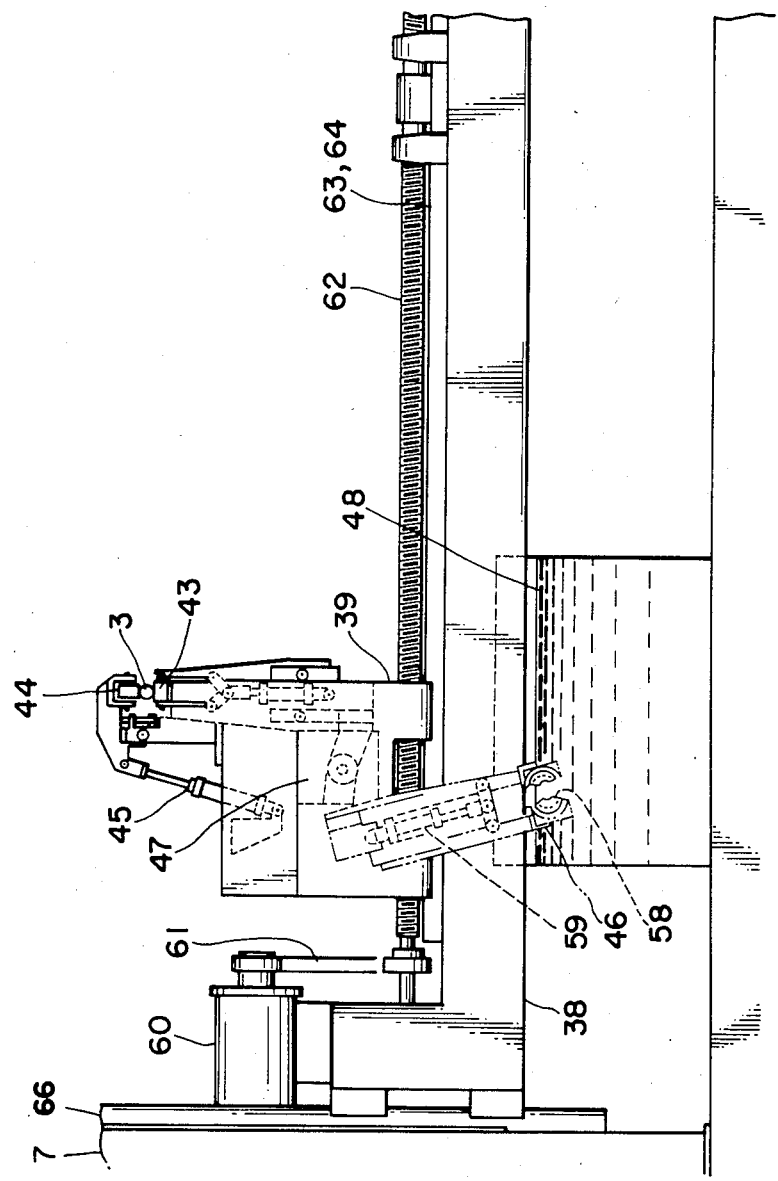
FIG. 7 is a partly cut-away front elevational view showing the essential part shown in FIG. 6, as viewed in the direction of arrows VII—VII of FIG. 6.

A pair of saddles 39 are mounted on the saddle 38, for movement along the rails 63, 64 which extend transversely of the tube inserting direction. A screw shaft 62 is rotatably provided on the saddle 38 to extend along the rails 63, 64. The screw shaft 62 is drivingly connected through a belt 61 to a motor 60 which is also mounted on the saddle 38. The screw shaft 62 have two halves which are threaded in opposite directions. These threaded halves mesh with corresponding saddles 39 as shown in FIG. 7. Therefore, when the screw shaft 62 rotates, the saddles 39 are moved towards each other or away from each other depending on the direction of rotation of the motor 60.

Figure 6:
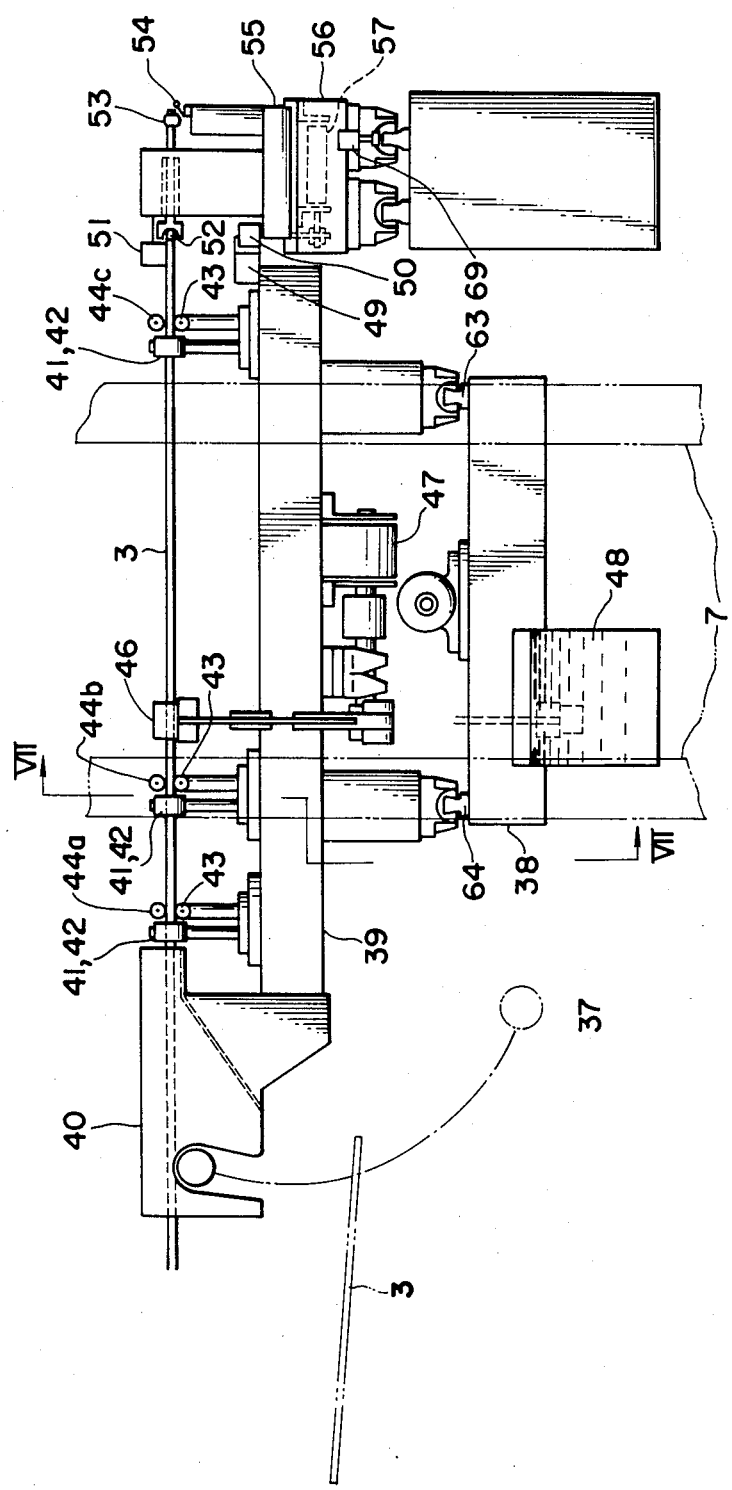
FIG. 6 is a partly cut-away side elevational view of a positioning apparatus in the embodiment shown in FIG. 1, as viewed in the direction of arrows VI—VI in FIG. 1.

Each of the saddles 39 carries a guide 40 and three sets of guide rollers each having vertical guide rollers and horizontal guide rollers, in alignment with each other in the tube inserting direction. The guide 40 has a configuration suitable for guiding the U-tube 3 to the guide rollers and is provided at its lower portion with a groove for receiving a supporting bar 37. The supporting bar 37 is a bar which extends, as shown in FIGS. 1 and 2, outwardly of the frame 7 along the lower portion of the latter. The supporting bar 37 is connected at its both ends to operating mechanisms provided on both sides of the frame 7. Each of these mechanisms is provided with a pair of actuators. By the operation of the actuators, the supporting bar 37 is moved from the position shown by two-dot-and-dash line in FIG. 6 to an upper portion of the groove in each guide 40, thereby to support the ends of the U-tube 3 from the lower side of the latter. Each set of guide rollers has a pair of lateral guide rollers 41, 42 and a pair of horizontal guide rollers 43, 44. The upper one 44 of the horizontal guide rollers is drivingly connected to a fluid actuator 45 mounted on the saddle 39 as shown in FIG. 7 so that it comes into contact with or gets out of contact with the U-tube 3 in accordance with the operation of this actuator 45.

In the positioning apparatus having the described construction, a pair of saddles 39 are moved under the control of the control unit D in accordance with the distance between parallel straight portions of the U-tube 3. At the same time, the saddle 38 is moved up and down in accordance with the level of the gripping device of the U-tube holding apparatus so as to make the saddle 38 hold the parallel portions of the U-tube while keeping the latter horizontally.

As stated before, a device for washing the U-tube and a device for polishing the same are incorporated in the positioning apparatus.

The washing device includes a washing member 46 disposed between second and third set of guide rollers on each saddle 39. The washing member 46 is driven by a rotary actuator 47 mounted on the lower side of the saddle 39 between the rails 63 and 64, so as to be rotated between a position where the end of the washing member 46 contacts the U-tube on the saddle 39 and a position in which the end of the washing member 46 is immersed in a washing liquid disposed at the lower side of the saddle 38. Each of washing members 46 is provided with an actuator 59 by which its end is opened and closed selectively. The washing member 46 carries at its end a sponge 58 which is adapted to be impregnated with the washing liquid. After impregnation of the sponge 58 with the washing liquid, the washing member 46 is rotated upwardly so that the sponge 58 is held on the path of movement of the U-tube 3 to make contact with the latter. Consequently, only contaminates which would impair the welding are removed from the surface of the U-tube.

Figure 8:
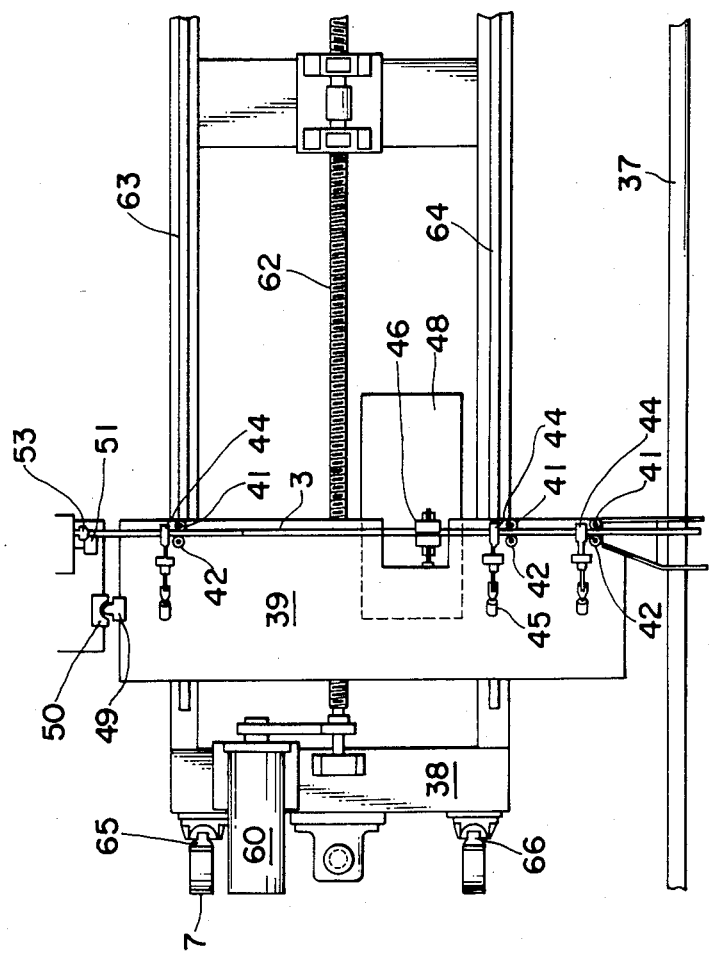
FIG. 8 is a partly cut-away plan view showing an essential part of a positioning apparatus similar to that shown in FIG. 6.

On the other hand, the polishing device includes a pair of saddles 56 movably carried by rails disposed in the vicinity of leading end edge of the saddle 39 as viewed in the tube inserting direction, the rails being extended in parallel with the rails 63, 64 on the saddles 38. A saddle 55 is mounted on each saddle 56 for movement in the tube inserting direction, and an actuator 57 mounted on the saddle 56 is drivingly connected to this saddle 55. Each saddle 55 is provided at its trailing end as viewed in the tube inserting direction with a dog 50 which has a groove conforming with a projection of a dog 49 provided on the associated saddle 39, as will be seen from FIG. 8. The arrangement is such that, when the saddles 55 are moved in the direction opposite to that for inserting the U-tube by the operation of an actuators 57 to engage the dogs 49 with corresponding dogs 50, each set of the saddle 55 and saddle 56 is moved together with the associated saddle 39. Each saddle 56 is provided with a brake 69 which starts to operate to engage with the rail simultaneously with the start of the operation of the actuator 55 in the direction for breaking the engagement between the dogs 49 and 50, i.e. in the tube inserting direct. As a result of the operation of the brake, the saddles 56 remain at the positions where the dogs are disengaged from each other.

Each saddle 55 further carries a flap wheel 51, a motor for driving this flap wheel and a sensor including a contactor 53 and a limit switch 54. The contactor 53 of the sensor is positioned to activate the limit switch 54 when pressed by the end of the U-tube 3 which has been driven into the positioning apparatus. The end portion of the contactor 53 is concaved to receive a guide 52 attached to the end of the U-tube 3. The guide 52 is a bullet-shaped member made of a plastic attached to each end of the U-tube 3 to facilitate the passing of the tube ends through the holes in the partition plates 8. The flap wheel 51 is disposed in parallel with the U-tube so as to rotate in contact with the U-tube 3 and to revolve around the latter, and is driven in accordance with the operation of the limit switch 54.

The partition plate holding apparatus C can have any construction constituted by known technics, provided that it can removably fix a predetermined number of partition plates at predetermined positions and levels. Similarly, the control unit D can have any known arrangement which has a control circuit including a computer and is adapted to control the operation of the above-described apparatus in a sequence which will be described later. No further description will be needed for the construction of the partition plate holding apparatus C and the control unit D.

As will be understood from the foregoing description, the apparatus A, B and C should be arranged in predetermined relationship in the horizontal plane and in the heightwise direction, in accordance with the kind and other conditions of the U-tubes to be inserted. However, it will be clear to those skilled in the art that these apparatus may be installed for independent adjustment of their position and height, provided that the relationship described as above can be settled during the automatic inserting operation.

The automatic tube inserting system of the described embodiment operations in a manner explained hereinunder with specific referenee to FIGS. 9a to 9g.

In advance of the start up of the tube inserting operation with this automatic tube inserting system, the partition plates 8 are fixed on the partition plate holding apparatus C with the corresponding holes of these plates 8 in axial alignment with each other. At the same time, the box 4 accommodating a multiplicity of U-tubes in a predetermined manner is placed in the U-tube holding apertures A. A multiplicity of holes of each partition plate are formed in parallel rows. These holes of each row are arranged so that the U-tube having the smallest radius of curvature is inserted first into a pair of holes arranged at the innermost of the row and then the U-tubes having progressively increasing radii of curvature are successively inserted into pairs of holes arranged outside of the innermost holes in order of size of radius to stride over the inserted U-tube one after another. The box 4 houses the U-tubes in a plurality of layers, each layer including U-tubes arranged in accordance with the order or sequence of the insertion, i.e. such that the U-tube of smallest radius of curvature is positioned at the innermost position and the U-tubes having progressively increasing radii of curvature are disposed at the outer side successively.

Then, the control unit D is manually operated to effect the initial set up of the automatic tube inserting system as follows.

(1) The truck 1 is moved to the position where the center of the bent portion of the U-tube 3 having the smallest radius of curvature is disposed just under the recess of the claw 13 of the gripping device.

(2) The height of the support 20 of the U-tube holding apparatus is adjusted such that the U-tube 3 held by the claws 13, 14 and lifted by the actuator 11 is brought, as a result of pivotal movement of the actuator 11, to the polishing level, i.e. the level that each end of the U-tube 3 is contactable with the contactor 53 of the associated polishing device.

(3) The height of the saddle 38 is adjusted such that the gap between the guide rollers 43, 44 on each saddle 39 of the positioning apparatus is aligned heightwise with the contactor 53 of the associated polishing device.

(4) Each saddle 39 is moved to the position where the end of the washing member 46 of the washing device can be immersed in the washing liquid.

(5) The swing arms 6 of the swing posts are rotated to be directed in the direction opposite to that for inserting the U-tube and heights of these arms are adjusted such that they are lower than the polishing level of the U-tube by a predetermined amount which is about 400 mm in the illustrated embodiment.

(6) The pressing plates 15, 16 of the U-tube clamping device are moved apart from each other.

(7) The piston rod 10 of the actuator 11 is retracted.

(8) The actuator 18 of the U-tube holding apparatus is extended and the table 26 is moved ahead in the tube inserting direction to make the same contact with the contactor of the limit switch 67.

(9) The contactor of the sensor 23 of the gripping device is allowed to be lowered by the gravity.

(10) The supporting bar 37 of the positioning apparatus is lowered.

(11) The saddles 56 of respective polishing devices are moved and each saddle 55 is moved by the actuator 57 to keep the dog 50 in engagement with the associated dog 49.

The automatic tube insertion system is started after the above initial set up. As a result, the operation is commenced in accordance with the program which is beforehand set in the NC circuit of the control unit, so that the actuator 11 of the U-tube holding apparatus is operated to lower the claws 13 and 14 attached to the end of the piston rod 10. Then, as the contactor of the sensor 23 contacts the U-tube 3, the sensor 23 operates to make a confirming signal upon receipt of which the control unit operates the actuator 22 thereby to make the claws 13 and 14 grip the U-tube 3. After the gripping of the U-tube, the claws 13 and 14 are moved upwardly by the actuator 11 to lift the U-tube 3 by a predetermined amount. In this state, under the control of the control unit the actuator 17 of the clamping device is actuated to move the pressing plates 15 and 16 towards each other to clamp the U-tube 3.

Simultaneously with the start of the series of operation explained above, the control unit delivers an instruction signal also to the positioning apparatus. Upon receipt of this signal, each motor 47 of the washing device is started to downwardly rotate the washing member 46 to dip the sponge 58 on the end thereof in the washing liquid of the cell 48. In this state, the actuator 59 makes a repetitional movement in accordance with the instruction given by the control unit so that the end of the washing member 46 is opened and closed repeatedly, thereby removing the contaminates from the sponge 58 and allowing the latter to be impregnated with the washing liquid. Then, each washing member 46 is rotated upwardly with the end thereof opened, and is stationed in the path of incoming of the U-tube to prepare for the washing.

As will be seen from FIG. 9, the control unit D effects a 90° rotation of the swing arm 6a of the swing post 5 closest to the truck 1 and raises the same to the level of polishing of the U-tube. Then, the swing arms 6b and 6c are successively operated similarly to the swing arm 6a and, thereafter, the supporting bar 37 of the positioning apparatus is raised through the action of the actuating mechanisms to support the ends of the U-tube 3.

At the same time, that the operation of the swing arms is commenced, the control unit D operates to start the motor 60 of the positioning apparatus to move the pair of saddles 39, before the rise of the supporting bar 37, until the distance between these saddles 39 comes to coincide with corresponding one of the breadths of the U-tubes which have been beforehand put in the NC circuit in accordance with the order of insertion of the tubes.

Figure 9A:
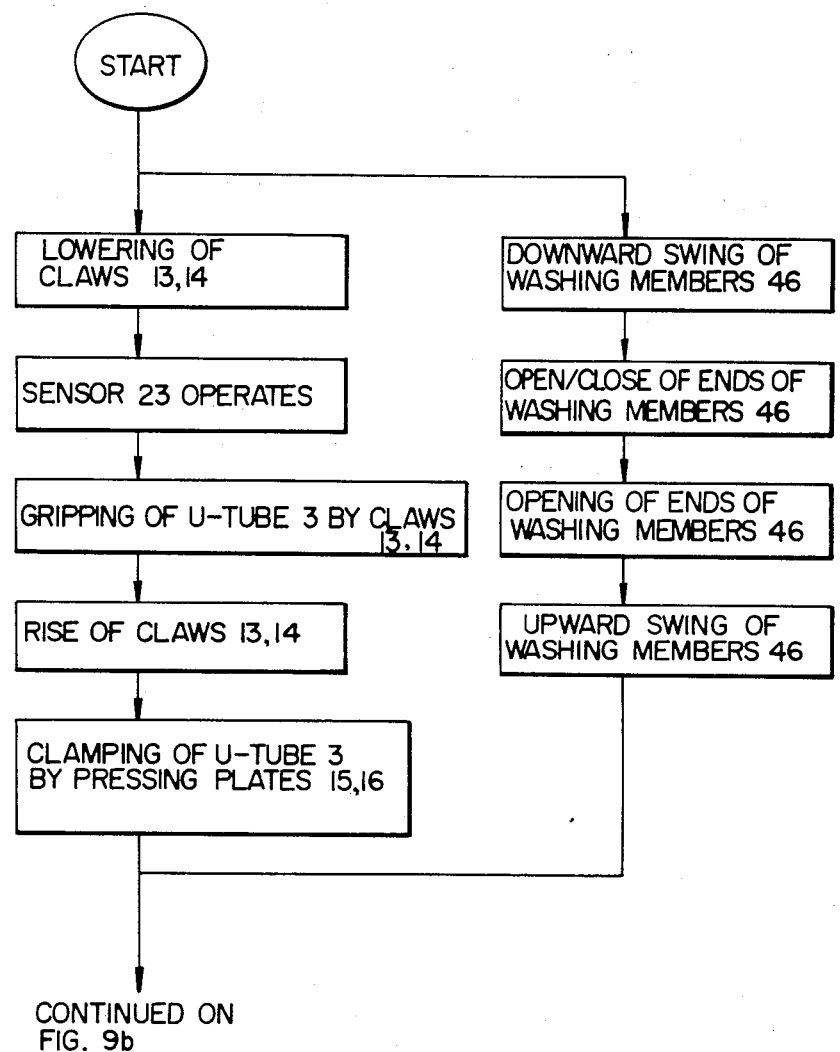
Figure 9B:
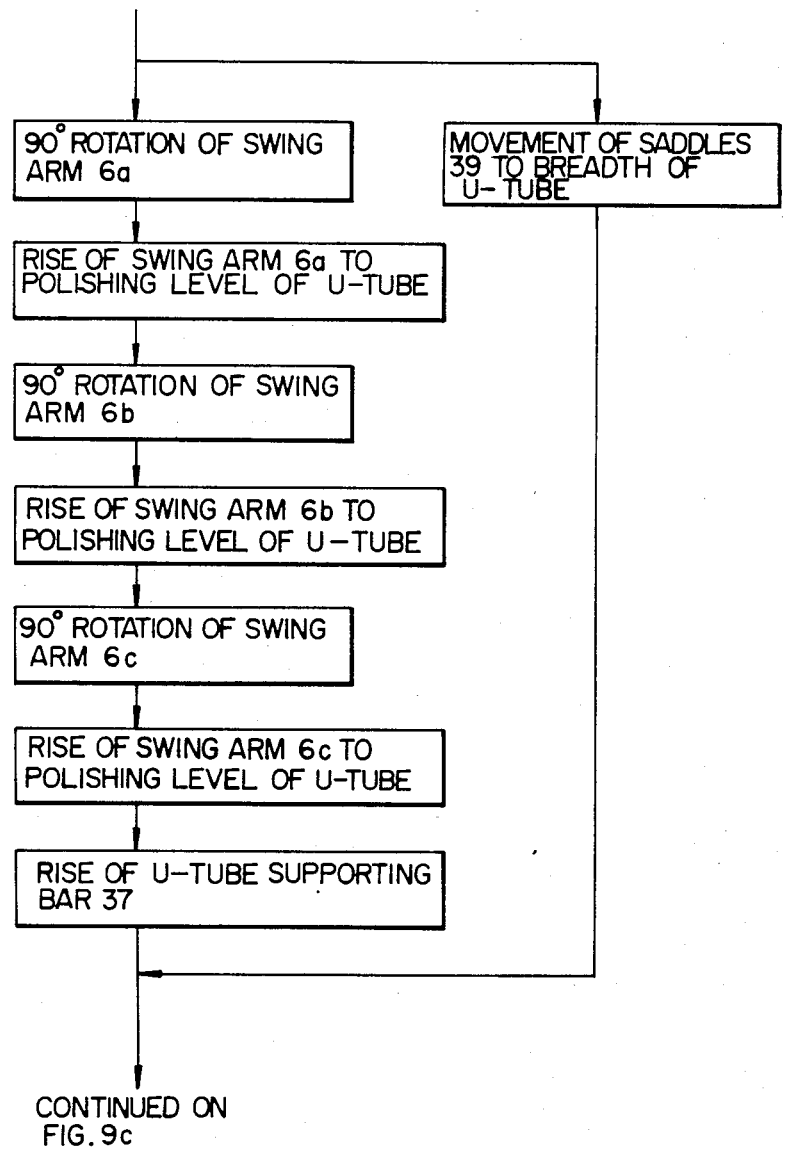
Figure 9C:
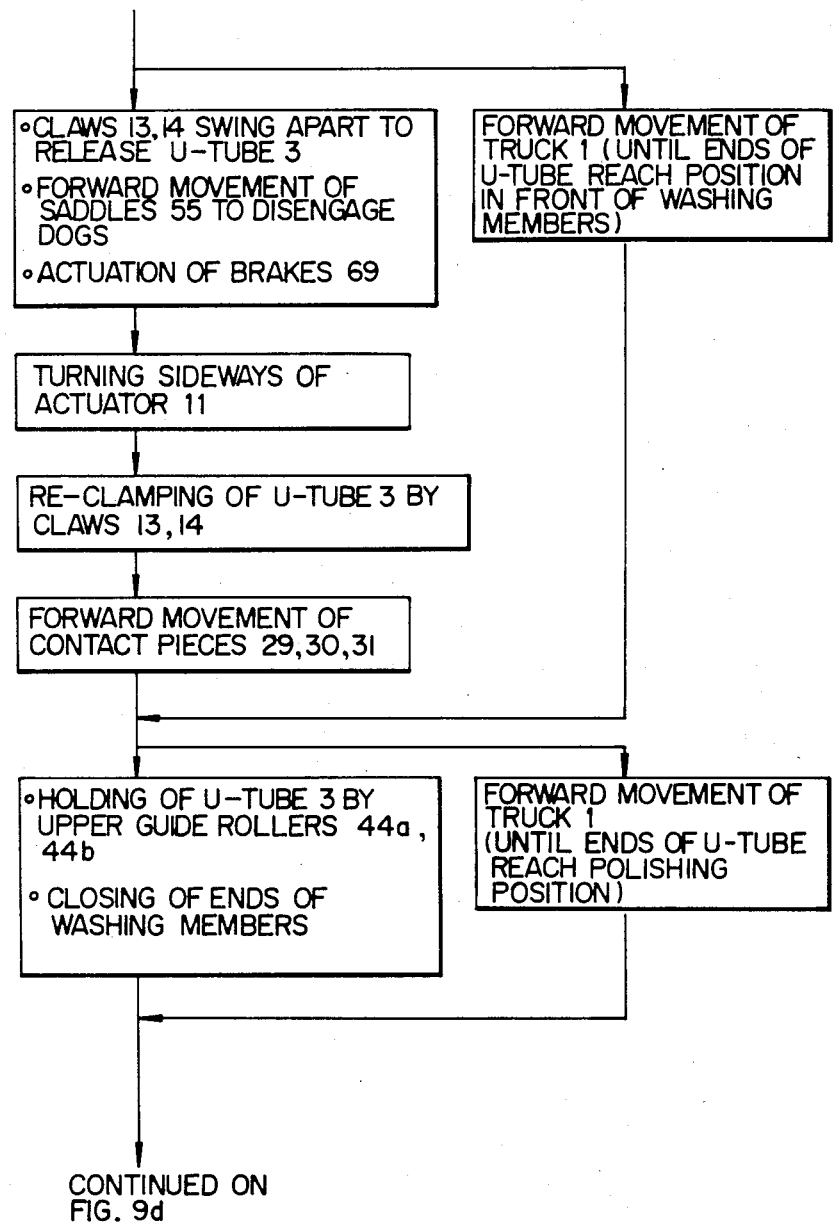
Figure 9E:
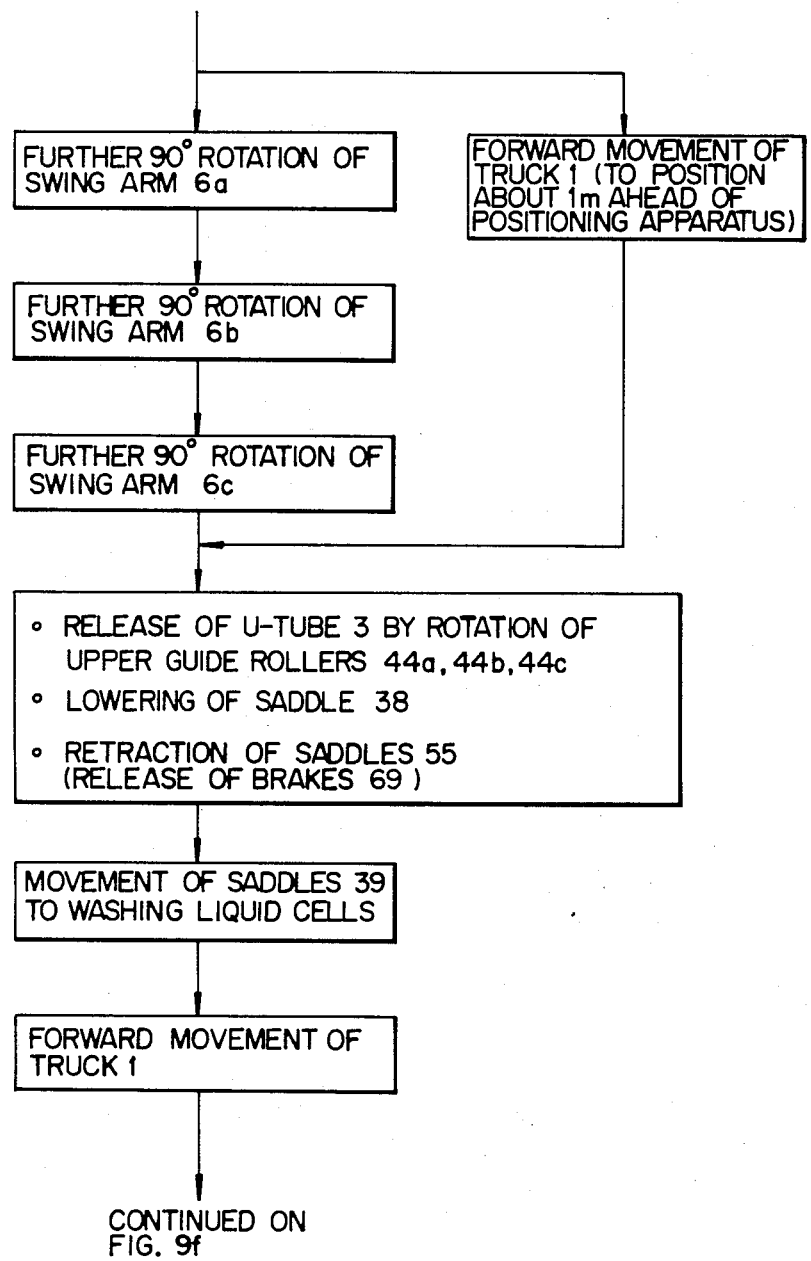
Figure 9G:
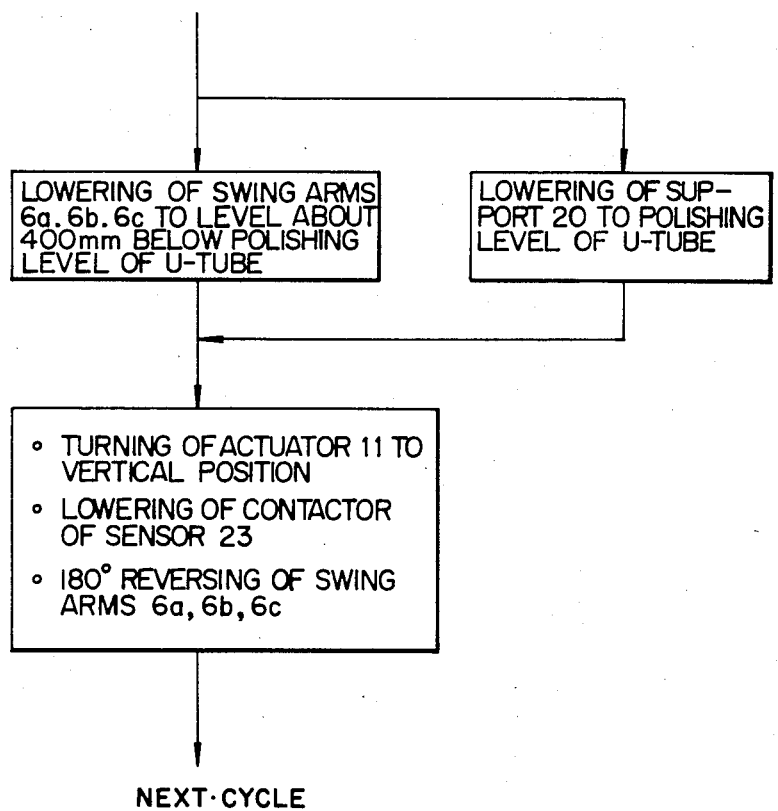

Subsequently, as shown in FIG. 9c, the claws 13 and 14 of the gripping device are moved away from each other by the instruction given from the control unit so that they temporarily release the U-tube 3 to prevent damaging of the U-tube which may be caused during the rotation of the actuator 11. At the same time, the control unit activates the actuator 57 of each polishing device to drive the saddle 55 in the tube inserting direction to release the engagement between the dogs 49 and 50. The brakes 69 are actuated at this moment to prevent the saddles 56 from moving the positions reached at the time of disengagement of the dogs 49, 50, i.e. from the positions where the distance between the contactors 53 of the polishing device corresponds to the breadth of the U-tube to be inserted.

Subsequently, the actuators 12 are operated to turn the actuator 11 sideways. At this moment, the groove 35 formed in the claw 13 is brought into engagement with the notch formed in the plate 36 on the ends of the guide bars 25. After the turning of the actuator 11 sideways, the control unit operates the actuator 22 to close the claws 13, 14 so that the claws again grip the bent portion of the U-tube 3.

The control unit then activates the actuators 32, 33 and 34 to move the contact pieces 29, 30 and 31 ahead thereby to bring them into contact with the bent portion of the U-tube 3. Simultaneously, the motor on the truck 1 is activated so that the truck 1 is moved in the tube inserting direction until the ends of the U-tube come to the positions just in front of respective washing members 46. Thereafter, the actuators 45 on respective saddles 39 are activated to rotate the guide rollers 44a and 44b to the positions where they can hold the U-tube. At the same time, the end of each washing member 46 stationed in the path of incoming of the U-tube is closed.

Concurrently with the above-explained operation, the control unit restarts the motor of the truck 1 so that the truck 1 is moved ahead over a predetermined distance until the ends of the U-tube are brought to the positions convenient for the polishing. At this moment, the linear portions of the U-tube 3 are rubbed by the sponges 58 which are impregnated with the washing liquid and held by the ends of the washing members 46, so that the outer surfaces of the U-tube is washed and cleaned.

Then, as shown in FIG. 9d, the remaining actuators 45 are operated under the control by the control unit to make the guide rollers 44c on the saddles 39 hold the U-tube 3. Meanwhile, the actuators 57 of the polishing device are operated to move the saddles 55 in the direction counter to the tube inserting direction. As a result of the movement of the saddles 55, the contactors 53 of the sensors on respective saddles are brought into contact with the guides 52 on the ends of the U-tube 3 to activate the limit switches 54. On the other hand, the ends of the cleaning members 46 are opened and the supporting bar 37 is lowered. Thereafter, the flap wheel 51 in contact with each end of the U-tube is driven to rotate while making a revolution around each end, thereby polishing the end of the U-tube 3.

Subsequently, the saddles 55 are moved in the tube inserting direction. After releasing of the engagement between the dogs 49 and 50, as well as the engagement between the ends of the U-tube and the contactors 53 of the sensors, the swing arms 6a, 6b, 6c of the U-tube holding apparatus, together with the support 20 of the truck 1 and the saddle 38 of the positioning apparatus, are raised under the control of the control unit D to the level of the aimed holes in the partition plates 8.

Subsequently, the truck 1 starts to move again in the tube inserting direction to insert the U-tube into the aimed holes in the partition plates 8. As the truck 1 approaches the swing arm 6a, this swing arm is further rotated 90° by the control of the control unit D to come out of the path of movement of the truck 1. Similar operation is carried out with the swing arm 6b and then with the swing arm 6c as the truck 1 further moves in the tube inserting direction. The truck 1 advances to a position which is at a predetermined distance (about 1 m in the illustrated embodiment) from the positioning apparatus. In the illustrated embodiment, the U-tube 3 has been inserted over its half length into the holes in the partition plates 8 when the truck 1 reaches this position.

In this state, the control unit gives an instruction of rotating the guide rollers 44a, 44b, 44c on each saddle 39 through the operation of the actuators 45 to release the U-tube 3 and then lowering the saddle 38 to the level of polishing of the U-tube 3. After the lowering of the saddle 38, the saddles 55 of the polishing device are retracted to engage the dogs 49 and 50 with each other, while releasing the brakes 69 of respective saddles 56.

Then, in order to prepare for the insertion of the next tube, each saddle 39 is moved to the position above the cell 48 which contains the washing liquid. After the movement of saddles 39, the truck 1 is moved ahead to the final position required for the full insertion of the U-tube 3.

Then, as shown in FIG. 9f, the actuators 17 of the clamping device are operated under the control of the control unit to move the pressing plates 15 and 16 away from each other thereby to release the U-tube 3. Subsequently, the actuator 11 is operates to extend its piston rod 10 to move the plate 36 ahead, thereby inserting the U-tube into the partition plates 8 to the final position.

The control unit D then operates the actuator 22 of the gripping device to swing the claw 14 away from the claw 13, thereby to release the U-tube 3 from the gripping device. In addition, the actuators 32, 33 and 34 are operated to return the contact pieces 29, 30 and 31 to the starting positions. The piston rod 10 of the actuator 11 is retracted in this stage thereby retracting the plate 36. Meanwhile, the truck 1 moves backwardly to bring the gripping device to a position convenient for picking up the next U-tube to be inserted. Since the positions of the bent portions of U-tubes in the box 4 are different, the data concerning the distances between the bent portions of adjacent tubes are beforehand inputted to the NC circuit of the control unit, so that the truck 1 can move backwardly to the position convenient for the picking up of the bent portion of the U-tube to be inserted next.

Then, after lowering the swing arms 6a, 6b and 6c of the U-tube holding apparatus, as well as the support 20, to the level set initially, the actuator 11 is rotated to resume the vertical posture. In consequence of the rotation of the actuator 11 to the vertical posture, the contactor of the sensor 23 projects from the claw 13 by the gravity. Then, the swing arms 6a, 6b and 6c are rotated 180° reversely to return to the initial positions.

The series of operation described hereinabove is repeated cyclically to successively insert a plurality of U-tubes into the holes in the partition plates. As will be understood from the description, according to the automatic tube inserting system of the invention, it is possible to automatically insert the U-tubes into the object such as the partition plates of a heat exchanger without causing any damage on the U-tube. The invention, therefore, greatly contributes to the saving of labour in assembling of equipments which have U-shaped heat transfer tubes, as well as to the improvement in the quality of the assembled products.

Although the invention has been described through a specific embodiments, it is to be noted that the described embodiment is not exclusive and various changes and modifications may be imparted thereto without departing from the scope of the invention which is limited solely by the appended claims.

What is claimed is:

1. A system for automatically and successively inserting a plurality of U-shaped heat transfer tubes into supporting members of an equipment such as a heat exchanger, said system comprising:

fixing means for removably fixing said support members at a predetermined pitch, each of said support members having a plurality of holes for receiving said heat transfer tubes, such that two holes in each support member for receiving both straight portions of an identical heat transfer tube are located at a substantially equal level and corresponding holes in said support members are axially aligned;

gripping means for gripping a heat transfer tube and raising the same to the level of the holes into which said heat transfer tube is to be inserted, said gripping means being movable relatively to said support members so as to be able to press the gripped heat transfer tube in the direction of alignment of said holes;

positioning means disposed between said gripping means and the support members fixed by said fixing means, said positioning means being adapted to clamp said heat transfer tube on said gripping means from the upper and lower sides and to clamp the straight portions of said heat transfer tube from both lateral sides to bring said heat transfer tube into alignment with the holes which are to receive said heat transfer tube while keeping said heat transfer tube in a horizontal posture; and control means operatively connected to said gripping means and said positioning means so as to sequentially control the operation of both means in accordance with a previously set order of insertion of said heat transfer tubes and the widths of said heat transfer tubes, the sequence being such that after said heat transfer tube is raised by said gripping means, said gripping means moves towards said support members while allowing said positioning means to clamp said heat transfer tube, as said heat transfer tube is inserted deeper into said support members, said heat transfer tube is released from the clamping by said positioning means and, after the completion of insertion of said heat transfer tube, said gripping means releases said heat transfer tube and is returned to a position for gripping the next heat transfer tube.

2. A system according to claim 1, further comprising means for washing the peripheral surface of the portion of said heat transfer tube to be inserted, said washing means being incorporated in said positioning means and being arranged such that when the straight portions of said heat transfer tube clamped by said positioning means are moved by said gripping means, said washing means washes the outer peripheral surface of said portions of said heat transfer tube along the length of the latter under the control of said control means.

3. A system according to claim 1, further comprising means for polishing the outer peripheral portions of the ends of the gripped heat transfer tube, said polishing means being incorporated in said positioning means and including sensors for detecting respective ends of said heat transfer tube, whereby, when said sensors detect the arrival of said ends of said heat transfer tube at polishing positions, said polishing means are brought into contact with said ends of said heat transfer tube to polish the peripheral surfaces thereof.

4. A system according to claim 2, further comprising means for polishing the outer peripheral portions of the ends of the gripped heat transfer tube, said polishing means being incorporated in said positioning means and including sensors for detecting respective ends of said heat transfer tube, whereby, when said sensors detect the arrival of said ends of said heat transfer tube at polishing positions, said polishing means are brought into contact with said ends of said heat transfer tube to polish the peripheral surfaces thereof.

5. A system according to claim 1, wherein said gripping means is adapted to grip the bent portion of said heat transfer tube substantially at the breadthwise center of said heat transfer tube, and said positioning means includes two pairs of members each pair of which is adapted to clamp the straight portion of said heat transfer tube from both sides thereof, said two pairs of members being movable, under the control of said control means, in symmetry with respect to the breadthwise center line of said heat transfer tube so as to make a distance between two pair of members equal to the breadth of said heat transfer tube to be clamped by said members.

6. A system according to claim 1, wherein said gripping means includes a plurality of contact pieces which are adapted to contact said heat transfer tube along the bent portion thereof, thereby to uniformly apply a gripping force to said heat transfer tube.

7. A system according to claim 1, wherein said gripping means includes a mechanism for gripping said heat transfer tube, a truck movable relatively to said fixing means, and a fluid actuator having a piston carrying at its end said gripping mechanism and a cylinder pivotally mounted on said truck, and wherein, when said cylinder is held in a vertical posture, the gripping of said heat transfer tube and the raising of said heat transfer tube by the retraction of said piston are effected, whereas the movement of said truck and the horizontal forwarding of said heat transfer tube by the extension of said piston are performed when said cylinder is in a horizontal posture.

* * * * *